July 30, 1929. J. F. ROMER 1,722,356
OPTICAL DEVICE FOR PHOTOGRAPHIC, CINEMATOGRAPHIC, AND OTHER PURPOSES
Filed March 31, 1927   2 Sheets-Sheet 2
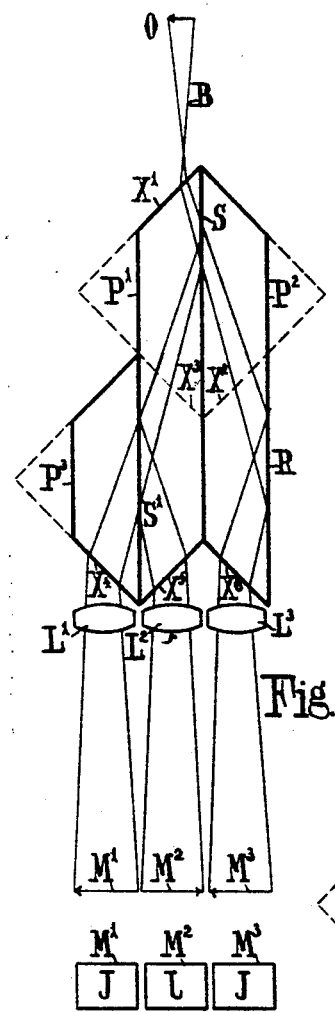
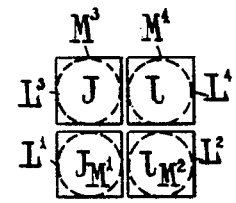
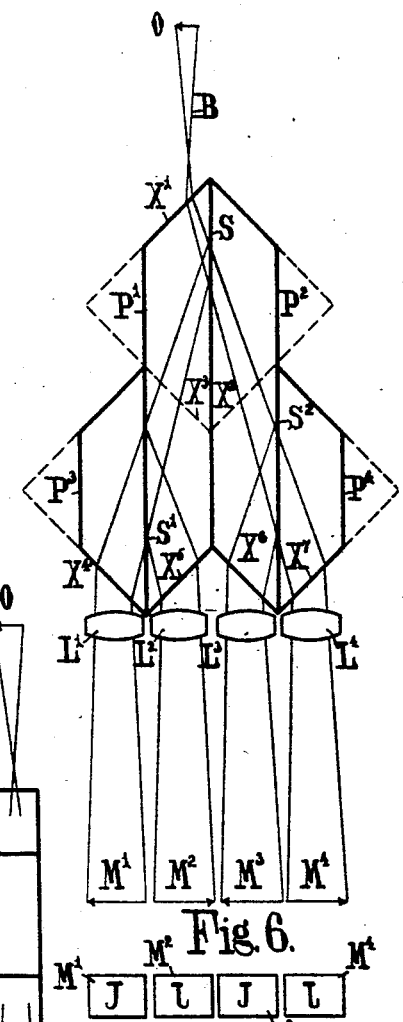
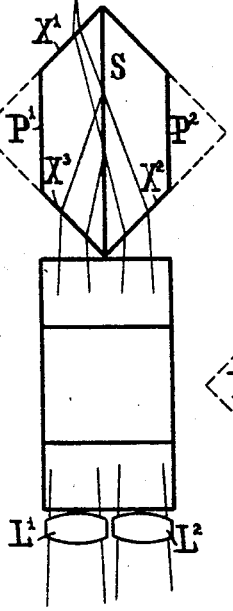
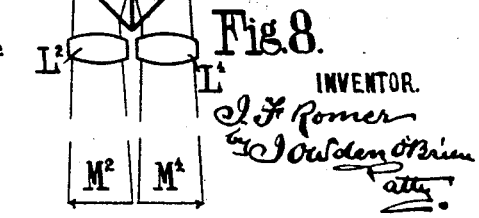
INVENTOR.

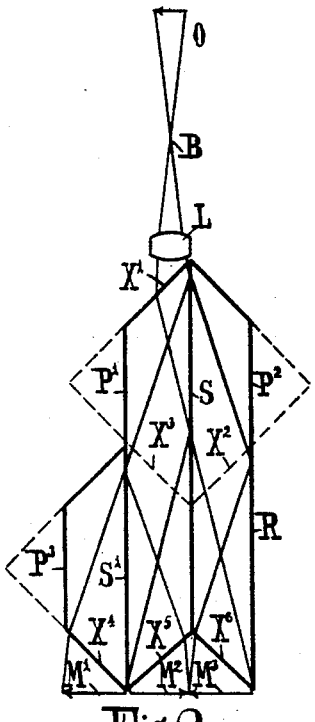
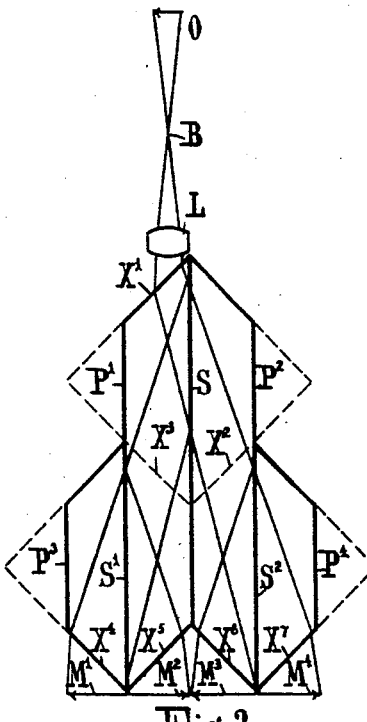
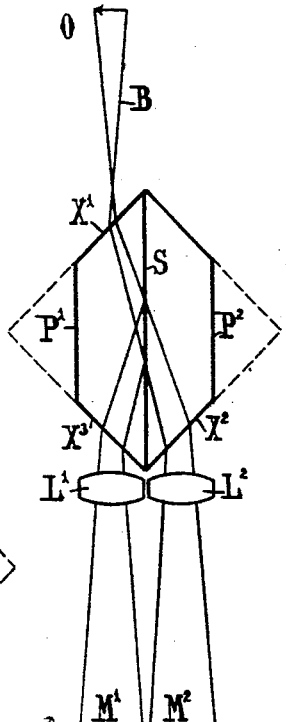
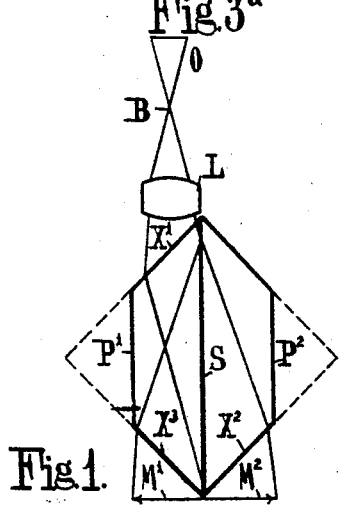

Patented July 30, 1929.

1,722,356

UNITED STATES PATENT OFFICE.

JAMES FREDERICK ROMER, OF WEST HAMPSTEAD, LONDON, ENGLAND, ASSIGNOR TO JOHN EDWARD THORNTON, OF LONDON, ENGLAND.

OPTICAL DEVICE FOR PHOTOGRAPHIC, CINEMATOGRAPHIC, AND OTHER PURPOSES.

Application filed March 31, 1927, Serial No. 180,025, and in Great Britain May 28, 1926.

This invention relates to improved optical apparatus for photographic, cinematographic and other purposes.

*General description.*

The primary object of the invention is to form a plurality of images arranged or disposed in adjacent areas of the same plane, the said images being of the same object, from the same point of view and therefore all alike as regards size, outline, and details, on a surface which is arranged at right angles to the axial ray of the incident beam of light.

The images so produced are all complementary to each other, and though of identical size and outline can be rendered different from each other by interposing suitable color filters in the paths of the light-beams.

By such means, color-component images can be formed upon a sensitive surface to represent a group of two colors, such as orange-red and blue-green; or a group of three colors, such as red, green, violet and yellow. Any other suitable combination of color components may be adopted. The invention can also be used for producing plurality-image groups of monochrome character known as two-tone or double-tone.

The plurality of images of the original scene produced by this optical device can be combined into a single image which may be utilized in either of the two following ways.

In the first method a group of component negative images produced by the apparatus upon plates or films can be re-combined to form an enlarged positive picture by projecting them in superimposition upon a screen, by the aid of suitable projection apparatus, correct illumination of the plate or film, correct filters, and the optical apparatus and lens or lenses, all used in combination. Such enlarged positive will be of the type technically termed "additive".

In the second method a group of component positives are printed from the component negatives and the positives are then combined by cementing them together, producing a single positive of the type technically termed "subtractive".

*Reference to other methods.*

In methods which have been previously proposed for producing such complementary images use has been made of the physical properties of total internal reflection and of the reflection of light from a surface or surfaces which partly transmit and partly reflect, to divide the incident beam of light into two or more parts and thereby to obtain two or more reversed complementary images i. e. each image is the reflection of the neighbouring image as seen in a plane mirror. One proposed device for obtaining such images, comprises two glass plates or prisms with a transparent screen between them which will reflect light of one color (blue) and transmit light of the complementary color (yellow). In such device the axial ray of the incident beam strikes the first surface of the first plate or prism at right angles to such surface. Moreover the length of the paths of the rays of light through the prisms are not equal so that the images are formed in different planes, the planes are not parallel to one another, and the images are not of the same size. In all apparatus using only these properties, there is moreover, firstly, a large absorption of light by the reflecting surfaces, and, secondly, there is the possibility of the production of multiple reflections from such surfaces which give rise to a slight haze or fog and prevent the final images from being as sharp and distinct as they would be if such reflections were absent.

*Description of the optical apparatus.*

In carrying out my invention I reduce the loss of light and almost entirely eliminate such multiple reflections, by reducing the number of reflecting surfaces and in addition, by making use of the physical property of refraction, the essential characteristics of my invention being the use of refraction at a plane surface which is not normal to the axis of the lens but set at an angle thereto less than 90°, and of reflection at a plane surface which is parallel to the axis of the lens to obtain the reversed or complementary images, the reflection taking place at a semi-transparent or semi-reflecting surface enclosed between the hypotenuses of two prisms, each of which may be regarded as having preferably one 90° angle and two 45° angles but having the 90° corner cut off. The two prisms are cemented together at their hypotenuses and form what is in effect a square block with two opposite corners cut off. The two parts of this block are preferably made of the same kind of glass and cemented with a cement, such as Canada balsam, having aproximately the same reflective index as the glass, in order that the refracted rays may pass freely from one half of the block to the other.

The incident beam of light strikes the first refracting surface which is on one side of the block, is refracted and transmitted through the glass to the semi-transparent, semi-reflecting surface, where it is divided into two parts, one part being transmitted to the second refracting surface which is parallel to the first, and emerging parallel to the incident beam, and the other part being reflected at the semi-transparent, semi-reflecting surface transmitted to the third refracting surface and emerging parallel to the first incident or emergent beam, but displaced from it laterally by an amount which may be varied according to whatever separation may be desired between the images.

With this arrangement two complementary images are obtained, and when it is desired to obtain more than two complementary images, one or both emergent beams of light may be transmitted through an additional block or blocks and further sub-divided by refraction and reflection.

In the accompanying drawings which illustrate the invention, Fig. 1 shows the arrangement of an optical system for producing two mutually reversed images, Fig. 1$^a$ the images produced, Figs. 2 and 3 show the arrangement of optical systems for producing three and four images respectively and Figs. 2$^a$ and 3$^a$ the images produced. Figs. 4, 5 and 6 show arrangements of optical systems for producing two, three and four reversed images respectively but characterized by having the lenses placed behind the blocks and Figs. 4$^a$, 5$^a$ and 6$^a$ the images produced. Figs. 7 and 8 show an arrangement of an optical system for obtaining four mutually reversed images in square formation and Fig. 9 shows the arrangement of the images.

Referring to Fig. 1, O is the object, L is a lens, P$^1$ and P$^2$ are two prisms which are cemented together at the surface S which is also a semi-transparent, semi-reflecting surface, the dotted lines showing the corners which may be cut off in order to save glass and M$^1$ and M$^2$, also shown in Fig. 1$^a$, are the mutually reversed images.

The incident beam of light B is refracted and transmitted by the lens L so that it strikes the first refracting surface X$^1$ which is set at an angle to the normal preferably at an angle of 45° to the incident beam, is refracted and transmitted to the semi-transparent semi-reflecting surface S parallel with the axial ray of the incident beam where it is divided, part being transmitted to the second refracting surface X$^2$ where it passes out of the block and forms the image M$^2$ and part being reflected and transmitted to the third refracting surface X$^3$ where it passes out of the block and forms the image M$^2$.

The two prisms P$^1$ and P$^2$ are cemented together with a transparent cement such as Canada balsam having approximately the same refractive index as the glass at the surface S.

The semi-transparent, semi-reflecting surface S may be made in any convenient manner such as for example by depositing silver, gold, or any other metal on the glass in the form of a very thin film by chemical means or by cathode ray deposition, or it may consist of a series of opaque reflecting strips separated by transparent spaces, or it may consist of a thin film of a dye which transmits light of one color and reflects light of another color, such a dye being cosine which transmits red and reflects yellow-green light. Thus it is possible to obtain the image M$^2$ in red light and the image M$^1$ in green light. The proportions of light which are transmitted and reflected respectively may be varied by varying the thickness of the film or the spacing of the reflecting strips.

With apparatus arranged in the manner described the length of paths of the beam of light from the object to the image is exactly the same for both images, consequently the images will be of the same size and will be located in the same focal plane; they will also be reversed relatively to each other as shown by the arrows.

When it is desired to obtain three mutually reversed images the arrangement of apparatus shown in Fig. 2 may be used. In this case O is the object, M$^1$, M$^2$ and M$^3$ are the three images which are also shown in Fig. 2$^a$, L is the lens, P$^1$ and P$^2$ are two glass rhombs which may be regarded as being made up of prisms similar to those illustrated in Fig. 1. If desired these rhombs could be made up from prisms which could then be cemented together at the surfaces indicated by the dotted lines X$^2$ and X$^3$ but it is more convenient to make them in one piece of glass. These rhombs are cemented together at the surface S which is semi-transparent, semi-reflecting. They are also cemented to the prisms P$^3$ at the surface S$^1$ which is also a semi-transparent, semi-reflecting surface. R is a totally reflecting surface, and X$^1$, X$^4$, X$^5$ and X$^6$ are refracting surfaces by which the light enters and leaves the composite block respectively.

The beam of light B from the object O after being refracted and transmitted by the lens L strikes the refracting surface X$^1$ preferably at an angle of 45° to the incident beams, and is refracted and transmitted to the semi-transparent, semi-reflecting surface S parallel with the axial ray of the incident beam where it is divided into two parts, one part being transmitted and striking the totally reflecting surface R, where it is reflected and emerges at the refracting surface $X^6$ to form the image $M^3$, the other part being reflected and transmitted to a second semi-reflecting surface $S^1$, where it is divided into two parts, one part being transmitted and emerging from the refracting surface $X^4$ to form the image $M^1$, the other part being reflected and emerging from the refracting surface $X^5$ to form the image $M^2$. All the images, as shown by the arrows, will be reversed relatively to each other.

When it is desired to obtain four mutually reversed images the arrangement of apparatus shown in Fig. 3 may be used. In this figure, O is the object as before, L the lens, $P^1$ and $P^2$ are glass rhombs cemented together at and enclosing the semi-transparent, semi-reflecting surface S, $X^2$ and $X^3$ indicating the surfaces which would be cemented together if the rhombs were made up from prisms, $P^3$ and $P^4$ are prisms cemented to the rhombs $P^1$ and $P^2$ at, and enclosing the semi-transparent, semi-reflecting surfaces $S^1$ and $S^2$, $X^1$, $X^4$, $X^5$, $X^6$ and $X^7$ are refracting surfaces by which the light enters and leaves the blocks respectively, and $M^1$, $M^2$, $M^3$ and $M^4$ are the four images which are mutually reversed as indicated by the arrows and which are also indicated in Fig. 3$^a$.

The beam of light B from the object O after refraction and transmission by the lens L strikes the first refracting surface $X^1$, is refracted and transmitted to the semi-transparent, semi-reflecting surface S where it is divided into two parts, one part being reflected and the other part transmitted; each of these two parts is again sub-divided by reflection at the semi-transparent, semi-reflecting surfaces $S^1$ and $S^2$ respectively into two parts, thus producing four beams of light which emerge from the refracting surfaces $X^4$, $X^5$, $X^6$ and $X^7$ respectively and form the four images.

In all the arrangements of apparatus which have been described the lenses are placed in front of the composite prismatic blocks, thus enabling long focus lenses to be used; but where it is desired to use lenses of short focus, this is not possible owing to the fact that the distance between the first and last refracting surfaces of the blocks is greater than the distance between the images and the lens when a lens of short focus is used, so that it is necessary in this case to place the lenses behind the blocks, and Fig. 4 shows an arrangement whereby this may be done. The prisms $P^1$ and $P^2$ are exactly similar to those shown in Fig. 1 and are cemented together with a transparent cement at, and enclosing the semi-transparent, semi-reflecting surface S, parallel with the axial ray of the incident beam. $L^1$ and $L^2$ are lenses which form the images $M^1$, $M^2$ also shown in Fig. 4$^a$ which are mutually reversed as indicated by the arrows. The dotted lines show the parts of the prisms which are unnecessary and which may be cut off.

The beam of light B from the object O strikes the first refracting surface $X^1$ preferably at an angle of 45° to the incident beam is refracted and transmitted to the semi-transparent, semi-reflecting surface S where it is divided into two parts, one part being transmitted and emerging at the refracting surface $X^2$ after which it is refracted and transmitted by the lens $L^2$ and forms the image $M^2$, the other part being reflected and emerging at the refracting surface $X^3$ after which it is refracted and transmitted by the lens $L^1$ and forms the image $M^1$. With apparatus arranged in the manner described the length of path of the beam of light from the object to the image is exactly the same for both images, consequently the images will be identical in size and will be located in the same focal plane.

When it is desired to obtain three images by using short focus lenses the arrangement of apparatus shown in Fig. 5 may be used. O is the object, $P^1$ and $P^2$ are glass rhombs similar to those shown in Fig. 2, which are cemented together at and enclosing the semi-transparent, semi-reflecting surface S arranged parallel with the axial ray of the incident beam, $P^3$ is a prism cemented to the rhomb $P^1$ at, and enclosing a second semi-reflecting surface $S^1$ parallel with the surface S, $L^1$, $L^2$ and $L^3$ are lenses which form the images $M^1$, $M^2$ and $M^3$ also shown in Fig. 5$^a$ the dotted lines $X^2$ and $X^3$ indicating as before the junctions if the rhombs were made from prisms. The beam of light B from the object O strikes the first refracting surface X preferably at an angle of 45° to the incident beam, is refracted and transmitted to the semi-transparent, semi-reflecting surface S, where it is divided into two parts, one part being transmitted to the totally reflecting surface R, where it is reflected, emerges from the refracting surface $X^6$; is refracted and transmitted by the lens $L^3$ and forms the image $M^3$; the other part being reflected from the surface S, transmitted to the second semi-transparent, semi-reflecting surface $S^1$ where it is again sub-divided, one part being reflected and emerging at the surface $X^4$ and after transmission through the lens $L^1$ forming the image $M^1$, the other part being transmitted and emerging at the refracting surface $X^5$, and after transmission by the lens $L^2$ forms the image $M^2$.

When it is desired to form four mutually reversed images, the arrangement of apparatus shown in Fig. 6 may be used. In this figure O is the object $M^1$, $M^2$, $M^3$ and $M^4$ the four mutually reversed images also shown in Fig. 6$^a$, $L^1$, $L^2$, $L^3$, $L^4$ are lenses, $P^1$ and $P^2$ are glass rhombs cemented together at the semi-transparent, semi-reflecting surface S arranged parallel with the axial ray of the incident beam, the dotted lines $X^2$, $X^3$ indicating as before the junctions if the rhombs were made from prisms, $P^3$ and $P^4$ are prisms cemented to the rhombs at and enclosing the semi-transparent, semi-reflecting surfaces $S^1$ and $S^2$, $X^1$, the reflecting surface by which the light enters and $X^4$, $X^5$, $X^6$ and $X^7$ the refracting surfaces by which the light leaves the composite block. The light from the object O after refraction at the surface $X^1$ preferably at an angle of 45° to the incident beam is transmitted to the semi-reflecting surface where it is divided into two parts, each of these two parts being again divided by the semi-transparent, semi-reflecting surfaces $S^1$ and $S^2$ and after transmission by the lenses $L^1$, $L^2$, $L^3$ and $L^4$ form the four images which are mutually reversed as indicated by the arrows.

With all the arrangements of apparatus which have been described the images are formed in line so that in the process of taking negatives it is necessary to use four films placed side by side. This however is not so convenient as the use of two films placed side by side, and having the reversed pictures arranged in square formation, two on each film. Alternatively with this method a single film of double the width can be used, thus making the process of handling still more convenient.

Figs. 7 and 8 show the arrangement of apparatus for obtaining four reversed images in square formation, Fig. 7 being an elevation, and Fig. 8 being an elevation at right angles to Fig. 7 and looking in the direction of the arrow A. $P^1$ and $P^2$ are prisms exactly similar in every respect to those shown in Fig. 1 and are cemented together at the semi-transparent, semi-reflecting surface S arranged parallel with the axial ray of the incident beam, $P^3$ and $P^4$ are prisms cemented together at the semi-transparent, semi-reflecting surface $S^1$, the composite block formed being turned around an axis parallel to the axes of the lenses $L^1$, $L^2$, $L^3$ and $L^4$ so that the plane of the semi-transparent, semi-reflecting surface $S^1$ is at right angles to the plane of the surface S. The prisms $P^3$ and $P^4$ are distinguished from the prisms $P^1$ and $P^2$ by being double the width in the plane of the surface $S^1$. $M^1$, $M^2$, $M^3$ and $M^4$ represents the four images. The beam of light B from the object O after refraction at the surface $X'$ preferably at an angle of 45° to the incident beam, is transmitted to the semi-reflecting surface S where it is divided into two parts, one part being transmitted and emerging at the surface $X^2$, the other part being reflected and emerging at the surface $X^3$. Both beams of light are then incident upon the surface $X^4$ and are refracted and transmitted to the semi-transparent, semi-reflecting surface $S^1$, where they are again divided thus giving four beams of light, two of which are reflected and two transmitted, emerging from the refracting surfaces $X^6$ and $X^5$ respectively, and after transmission through the lenses $L^1$, $L^2$, $L^3$ and $L^4$ forming the four images as indicated by the arrows.

The arrangement of the images is still further indicated by Fig. 9 in which the square $M^1$, $M^2$, $M^3$ and $M^4$ represent in the four images, the letters J indicating exactly the relative position of the images to each other. The dotted circles represent the lenses $L^1$, $L^2$, $L^3$ and $L^4$.

With apparatus arranged in the manner described the four images are formed in the same focal plane and are of the same size; the lengths of the optical paths through glass and air are also exactly the same, thereby enabling any corrections necessary for chromatic aberrations and distortion to be made in the lenses in such a manner that they will affect all the images equally, and the superimposing of the reversed pictures will consequently not thereby be injuriously affected. Although I have shown four lenses placed behind the composite prismatic blocks in Figs. 7 and 8 as they would be arranged if it were desired to use lenses of short focus, the apparatus can equally well be arranged with one lens of long focus placed between the object and the first prism as shown in Fig. 3.

*Additions and modifications.*

Although the primary object of this invention is to produce a plurality of images of the original object and then to combine these images into a single picture of the object by either of the methods hereinbefore described for photographic and cinematographic purposes, it may be applied to any other purpose where it is desired to obtain a plurality of images and then to combine them.

Where two images are desired they are produced upon a photographic or cinematographic sensitized surface of double picture area, arranged side by side upon a double-width strip or upon two single-width strips or in alternating position upon a single-width strip.

Where three images are desired they are produced upon a similar surface of triple picture area, arranged side by side upon a triple width strip or upon three single-width strips, or in alternating position upon a single-width strip.

Where four images are desired they are produced upon a similar surface of quadruple picture area, arranged in square formation two above and two below upon a double-width strip, or in line formation side by side upon a four-width strip or upon four separate single-width strips or upon two double-width strips.

The invention is applicable for the production of cinematographic (motion) pictures upon continuous strips, and also to ordinary (non-motion) pictures of miscellaneous types and sizes, lantern transparencies, and other forms of photographs, and for making original negatives, positives for exhibition, or intermediate printing-cliche reproductions.

What I claim as my invention and desire to protect by Letters Patent is:—

1. Optical apparatus for producing a plurality of complementary images from a single object comprising a right angle prism a semi-reflecting, semi-transparent layer coated upon the hypothenuse of said prism, a second right angled prism cemented by its hypothenuse to the hypothenuse of the first prism, the hypothenuses being arranged parallel to the axial ray of the incident beam of light this axial ray striking the first prism at an angle of 45° being reflected on to the semi-reflecting semi-transparent layer, divided into two beams one half being being reflected by said semi-reflecting semi-transparent layer the axial ray emerging from the first prism parallel with the incident beam, and the other half beam passing through said layer into the second prism, the axial ray emerging therefrom parallel with the incident beam, the images produced being in the same plane and identical in size.

2. Optical apparatus for producing a plurality of complementary images from a single object comprising a right angle prism a semi-reflecting, semi-transparent layer coated upon the hypothenuse of said prism a second right angled prism cemented by its hypothenuse to the hypothenuse of the first prism the hypothenuses being arranged parallel to the axial ray of the incident beam of light this axial ray striking the first prism at an angle of 45° being refracted on to the semi-reflecting, semi-transparent layer, divided into two beams one half beam being reflected by said semi-reflecting, semi-transparent layer, the axial ray emerging from the first prism parallel with the incident beam and the other half beam passing through said layer into the second prism, the axial ray emerging therefrom parallel with the incident beam, additional prisms cemented to the aforesaid prisms to receive the divided beams and refract them and additional partially transmitting, partially reflecting surfaces coated upon the hypothenuses of said additional prisms to further split up the beams divided by the first partially transmitting, partially reflecting surface, the four images produced being in the same plane and identical in size.

3. Optical apparatus for producing simultaneously a plurality of complementary images from a single object comprising in combination, a right angled prism having a refracting surface arranged at an angle of approximately 45° to the axial ray of the incident beam, a second right angled prism arranged in relation to the first prism so as to form a block of refracting material which is rectangular in plan and elevation and a partially transmitting partially reflecting surface parallel with the axial ray of the incident beam between the hypothenuses of the two prisms to divide the beam into two parts.

4. Optical apparatus for producing simultaneously, a plurality of complementary images from a single object comprising in combination a plurality of right angled prisms arranged in pairs, partially transmitting, partially reflecting surfaces arranged between the hypothenuses of each pair of prisms parallel to the axial ray of the incident beam and refracting surfaces at an angle of approximately 45° to said axial ray between the prisms of one pair and those of an adjacent pair.

5. Optical apparatus for producing simultaneously a plurality of complementary images from a single object, comprising in combination a plurality of right angled prisms arranged in pairs, partially transmitting, partially reflecting surfaces arranged between the hypothenuses of each pair of prisms parallel to the axial ray of the incident beam, refracting surfaces at an angle of approximately 45° to said axial ray between the hypothenuses of the prisms of one pair and those of an adjacent pair and a lens through which the incident beam passes to produce real images.

In testimony whereof I have hereunto set my hand.

JAMES FREDERICK ROMER.